(12) United States Patent
Hoshide et al.

(10) Patent No.: US 11,199,227 B2
(45) Date of Patent: Dec. 14, 2021

(54) LUBRICANT SUPPLYING DEVICE AND GUIDING DEVICE

(71) Applicant: THK CO., LTD., Tokyo (JP)

(72) Inventors: Kaoru Hoshide, Tokyo (JP); Katsuya Iida, Tokyo (JP); Tetsuhiro Nishide, Tokyo (JP); Takuya Horie, Tokyo (JP); Takeshi Shimamura, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/764,074

(22) PCT Filed: Nov. 9, 2018

(86) PCT No.: PCT/JP2018/041745
§ 371 (c)(1),
(2) Date: May 14, 2020

(87) PCT Pub. No.: WO2019/098146
PCT Pub. Date: May 23, 2019

(65) Prior Publication Data
US 2020/0386273 A1 Dec. 10, 2020

(30) Foreign Application Priority Data
Nov. 16, 2017 (JP) .............................. JP2017-220738

(51) Int. Cl.
*F16C 33/66* (2006.01)
*F16C 29/06* (2006.01)

(52) U.S. Cl.
CPC ...... *F16C 33/6659* (2013.01); *F16C 29/0633* (2013.01); *F16C 33/6622* (2013.01)

(58) Field of Classification Search
CPC ............... F16C 29/005; F16C 29/0633; F16C 33/1045; F16C 33/6622; F16C 33/6637; F16C 33/6659; F16C 33/6681
See application file for complete search history.

(56) References Cited

U.S. PATENT DOCUMENTS

| 6,257,766 | B1 | 7/2001 | Agar | |
| 8,147,141 | B2* | 4/2012 | Fumoto | F16C 33/6681 |
| | | | | 384/13 |
| 9,816,559 | B2* | 11/2017 | Chiu | F16C 33/6648 |

FOREIGN PATENT DOCUMENTS

| JP | 2000-145769 A | 5/2000 |
| JP | 2007-271003 A | 10/2007 |

OTHER PUBLICATIONS

International Search Report dated Feb. 12, 2019, issued in counterpart application No. PCT/JP2018/041745 (2 pages).

(Continued)

*Primary Examiner* — James Pilkington
(74) *Attorney, Agent, or Firm* — Westerman, Hattori, Daniels & Adrian, LLP (57) ABSTRACT

A lubricant supplying device has: a mounted member that is mounted to a moving member, which moves along a rail, and that is disposed with an interval between the mounted member and concave portions that are provided in the rail along a length direction of the rail; and a supply path unit that is removably attached to the mounted member, wherein the supply path unit has an introducing port into which a lubricant is supplied, supplying members that project out from the mounted member toward the concave portions and supply the lubricant to rolling surfaces of the concave portions on which rolling bodies that are provided at the moving member roll, and a tubular member that connects the introducing port and the supplying members, and the mounted member has an accommodating portion that is concave and accommodates the supply path unit from the length direction of the rail.

5 Claims, 11 Drawing Sheets

(56) References Cited

OTHER PUBLICATIONS

Written Opinion dated Feb. 12, 2019, issued in counterpart application No. PCT/JP2018/041745 (4 pages).

* cited by examiner

FIG.11

LUBRICANT SUPPLYING DEVICE AND GUIDING DEVICE

CROSS-REFERENCE TO RELATED APPLICATION

This application is based upon and claims the benefit of priority of the prior Japanese Patent Application No. 2017-220738 filed on Nov. 16, 2017, the contents of which are incorporated by reference into the present specification.

BACKGROUND

Technical Field

The present disclosure relates to a lubricant supplying device for supplying a lubricant to a rail on which a moving member moves, and to a guiding device that uses this lubricant supplying device.

Background Art

Japanese Patent Application Laid-Open (JP-A) No. 2007-271003 discloses a technique of, by adding on afterwards a lubricant supplying device to a moving member that moves along a rail, supplying a lubricant to between rolling bodies, which are provided at the moving member, and rolling surfaces of a rail on which the rolling bodies roll.

SUMMARY OF INVENTION

Technical Problem

By the way, in the lubricant supplying device disclosed in JP-A No. 2007-271003, supply paths and supplying portions of the lubricant are formed integrally with a mounted member that is mounted to the moving member. The supplying portions have discharge openings for the lubricant. In order for the lubricant to be supplied to the rolling surfaces of the rail through these discharge openings, the discharge openings project out toward vicinities of the rolling surfaces. Therefore, the interval between the pair of supplying portions is narrower than the width of the rail, and the mounted member cannot be placed on the rail from a side. Thus, in a case of adding the lubricant supplying device afterwards to the moving member that is on the rail, the mounted member must be moved from an end portion of the rail to the moving member.

In view of the above-described circumstances, the subject of the present disclosure is the provision of a lubricant supplying device, which can be added later from a side of a rail to a moving member that is on the rail, and a guiding device that uses this lubricant supplying device.

Solution to Problem

A lubricant supplying device of one aspect of the present disclosure has: a mounted member that is mounted to a moving member, which moves along a rail, and that is disposed with an interval between the mounted member and concave portions that are provided in the rail along a length direction of the rail; and a supply path unit that is removably attached to the mounted member, wherein the supply path unit has an introducing port into which a lubricant is supplied from an exterior, supplying members that project out from the mounted member toward the concave portions and supply the lubricant to rolling surfaces of the concave portions on which rolling bodies that are provided at the moving member roll, and a tubular member that connects the introducing port and the supplying members, and the mounted member has an accommodating portion that is concave and accommodates the supply path unit from the length direction of the rail.

Advantageous Effects of Invention

In accordance with the present disclosure, there can be provided a lubricant supplying device, which can be added later from a side of a rail to a moving member that is on the rail, and a guiding device that uses this lubricant supplying device.

DESCRIPTION OF EMBODIMENTS

Forms for embodying the present disclosure are described in detail hereinafter. However, the present disclosure is not limited to the embodiments described hereinafter.

First Embodiment

Figure 1:
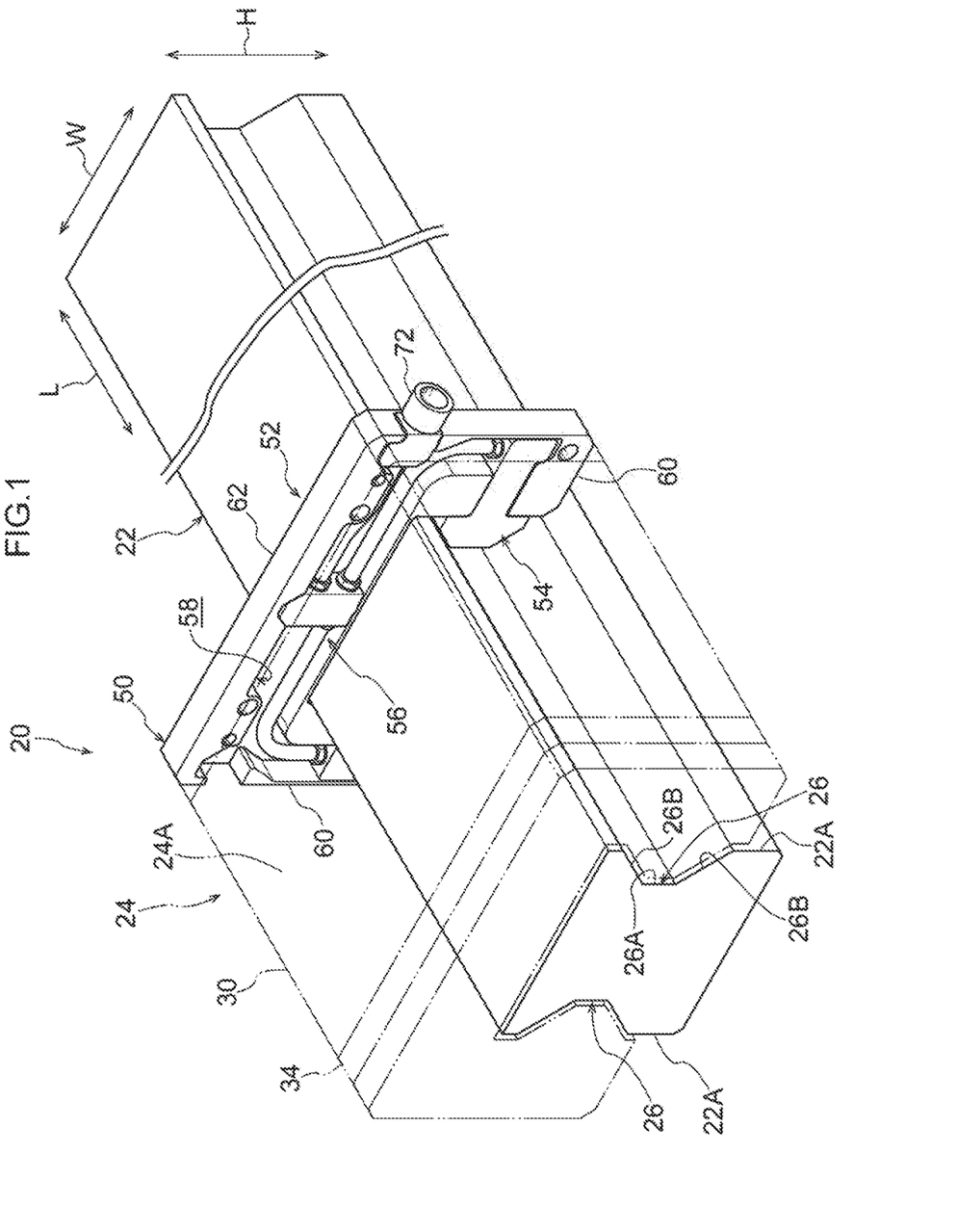
FIG. 1 is a perspective view of a guiding device relating to a first embodiment.

As shown in FIG. 1, a guiding device 20 of the present embodiment has a track rail 22, a moving block 24, and a lubricant supplying device 50. Note that, in the present embodiment, the length direction of the track rail 22 (hereinafter appropriately called "rail length direction") is denoted by arrow L. A first direction (hereinafter appropriately called "rail width direction") that is orthogonal to the rail length direction of the track rail 22 is denoted by arrow W. A second direction (hereinafter appropriately called "rail height direction"), which is orthogonal to the rail length direction and is orthogonal to the rail width direction of the track rail 22), is denoted by arrow H.

As shown in FIG. 1, the track rail 22 of the present embodiment extends in a rectilinear form. The cross-sectional shape of this track rail 22 is substantially quadrangular. Note that what is called cross-sectional shape of the track rail 22 here means the shape of the cross-section in which the track rail 22 is cut along a direction orthogonal to the rail length direction.

Concave portions 26 are respectively formed in both side surfaces 22A in the rail width direction (the left and right side surfaces in FIG. 8) of the track rail 22. The concave portions 26 extend along the rail length direction of the track rail 22. Note that the concave portions 26 of the present embodiment extend from one end portion to another end portion in the rail length direction of the track rail 22. Further, side wall surfaces 26B of the concave portions 26 are inclined with respect to the rail width direction such that the intervals between the side wall surfaces 26B become wider from bottom surfaces 26A toward opening sides.

Figure 8:
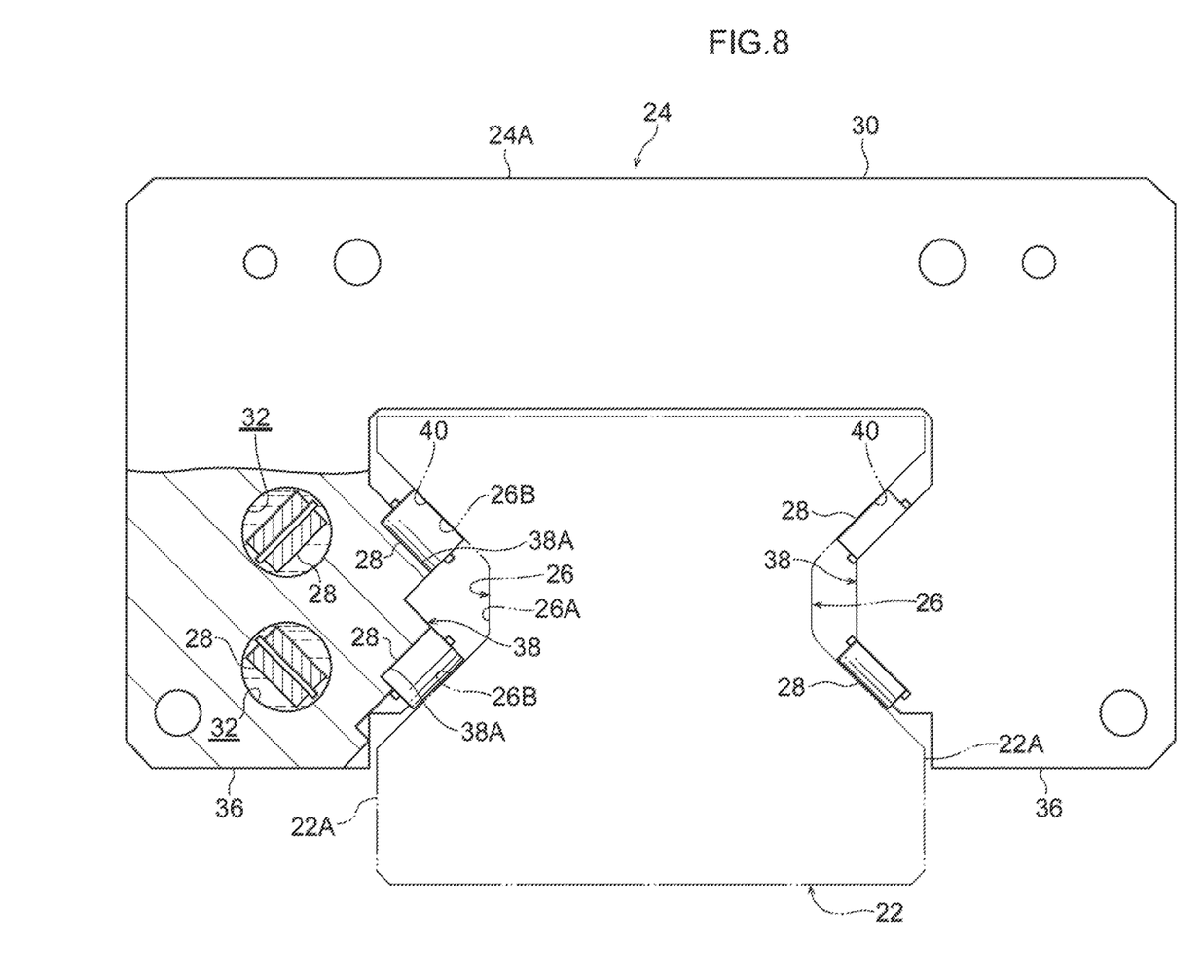
FIG. 8 is a front view of a moving member of the guiding device shown in FIG. 1.

As shown in FIG. 8, rolling body rolling surfaces, on which plural rollers 28 that are described later of the moving block 24 roll, are structured by at least portions of the side wall surfaces 26B of the track rail 22.

Note that the track rail 22 of the present embodiment is an example of the rail in the present disclosure.

The moving block 24 is a member that is structured so as to be able to move along the track rail 22. This moving block 24 has a block main body portion 30, non-loaded rolling body rolling paths 32, the rollers 28 that are examples of the rolling bodies, and a pair of cover members 34 (see FIG. 1).

As shown in FIG. 8, the cross-sectional shape of the block main body portion 30 is substantially gate shaped. Note that what is called cross-sectional shape of the block main body portion 30 here means the shape of the cross-section in which the block main body portion 30 is cut along a direction orthogonal to the rail length direction. The track rail 22 is disposed between both leg portions 36 of the block main body portion 30. Projecting portions 38, which project out with respect to the both concave portions 26 of the track rail 22, are provided at the both leg portions 36, respectively. These projecting portions 38 are formed in shapes (substantially trapezoidal shapes) that substantially correspond to the concave portions 26. Concretely, both side wall surfaces 38A of the projecting portions 38 are disposed so as to face the both side wall surfaces 26B of the concave portions 26 with intervals therebetween respectively. Note that the loaded rolling body rolling surfaces on which the rollers 28 roll are structured by at least portions of the side wall surfaces 38A of the projecting portions 38. Further, the aforementioned loaded rolling body rolling surfaces that are provided at the moving block 24 and the aforementioned rolling body rolling surfaces that are provided at the track rail 22 face one another. Load rolling body rolling paths 40 on which the rollers 28 roll are formed between the aforementioned loaded rolling body rolling surfaces and the aforementioned rolling body rolling surfaces.

The non-loaded rolling body rolling paths 32 are through-holes that pass-through the block main body portion 30 along the moving direction of the moving block 24 (the same direction as the rail length direction), and are formed at positions that face the side wall surfaces 38A of the projecting portions 38. A lubricant is filled within these non-loaded rolling body rolling paths 32. Plural rollers, which are held by roller holding bands that are described later, are transferred within the non-loaded rolling body rolling paths 32.

The plural rollers 28 are connected in a series via the roller holding bands, and are structured so as to circulate on endless circulating paths while being held by the roller holding bands. Note that what are called the endless circulating paths (not illustrated) here are structured by the loaded rolling body rolling paths 40, the non-loaded rolling body rolling paths 32, and a pair of direction turnaround paths (not illustrated) that are described later.

As shown in FIG. 1, the cover members 34 are mounted to the both end portions in the moving direction of the moving block 24, respectively. The direction turnaround paths are provided at the cover members 34. The direction turnaround paths are paths that connect the end portions of the non-loaded rolling body rolling paths 32 and the end portions of the loaded rolling body rolling paths 40, respectively. Namely, due to the cover members 34 being mounted to the both end portions of the moving block 24 respectively, the endless circulating paths are structured by the non-loaded rolling body rolling paths 32, the loaded rolling body rolling paths 40, and the pair of direction turnaround paths. Note that, in the present embodiment, among the four endless circulating paths, the endless circulating paths that are lined-up in the rail height direction are structured so as to cross above and below one another.

Further, in the present embodiment, a plurality of the moving blocks 24 are disposed on the track rail 22. These moving blocks 24 support a table 42. Concretely, the table 42 is fixed to the moving blocks 24 in a state in which the table 42 is placed on supporting surfaces 24A (the top surfaces in FIG. 8) of the moving blocks 24. This table 42 moves along the track rail 22, together with the plural moving blocks 24. Note that a transported object or the like is placed on the table 42. Note that the table 42 of the present embodiment is an example of the supported member in the present disclosure.

As shown in FIG. 1, the lubricant supplying devices 50 are structured so as to be attached, via the cover members 34, to the both end portions in the moving direction of the moving block 24 respectively. This lubricant supplying device 50 has a case 52 and a supply path unit 56 that includes supplying members 54, and supplies lubricant to the aforementioned rolling body rolling surfaces that structure the concave portions 26 of the track rail 22. Note that grease or oil or the like may be used as the lubricant.

Figure 4:
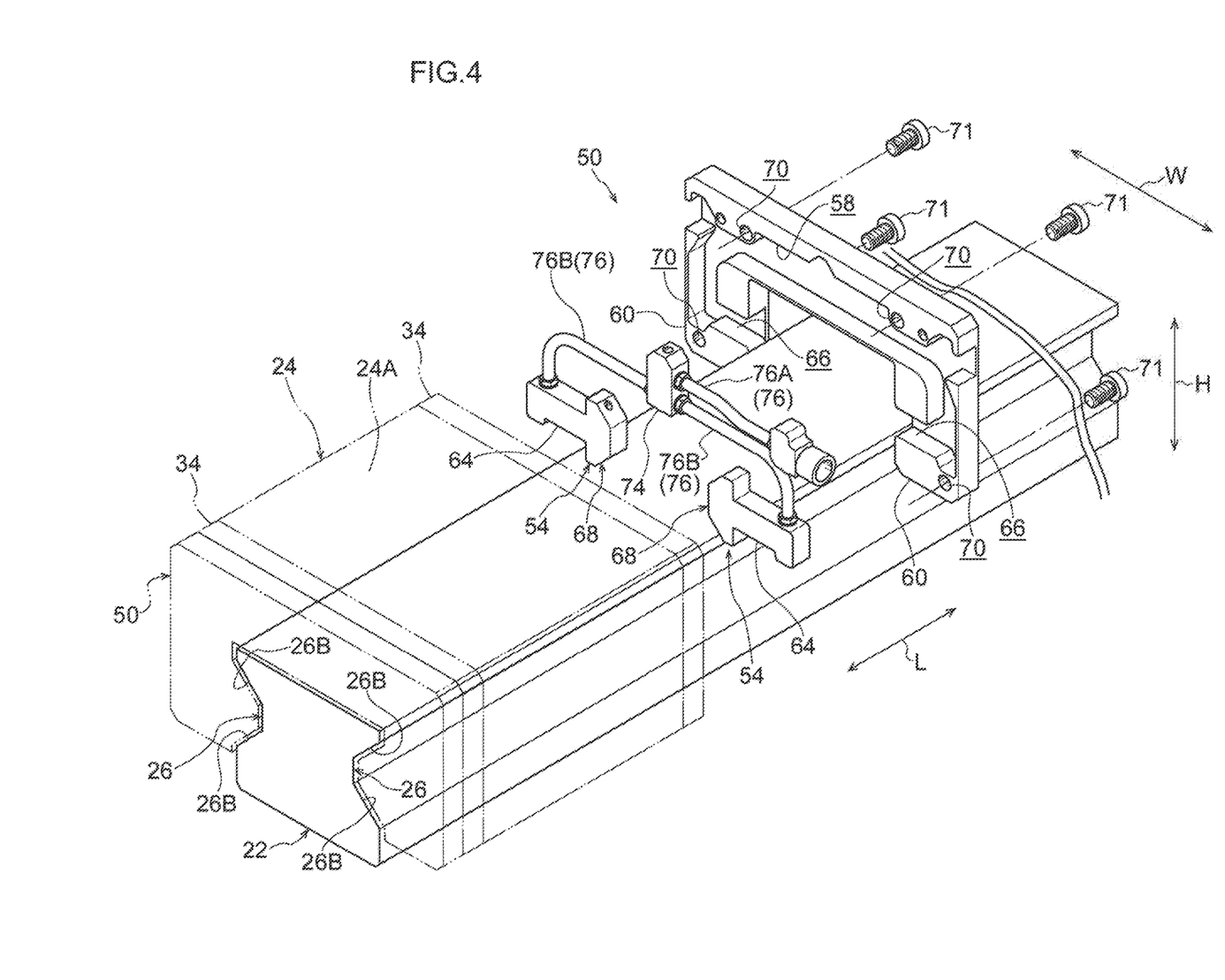
FIG. 4 is an exploded perspective view of the lubricant supplying device shown in FIG. 2.

As shown in FIG. 1, the case 52 is a part that is mounted to the moving block 24, and is structured such that the supply path unit 56 that includes the supplying members 54 is detachably attached thereto. An accommodating portion 58, which is concave and accommodates the supply path unit 56 from the thickness direction of the case 52, is provided at the case 52. As shown in FIG. 4, the supply path unit 56 is accommodated in the accommodating portion 58 from the rail length direction, in a state in which the case 52 is disposed on the track rail 22. The supply path unit 56 is attached to the case 52 by the supply path unit 56 being accommodating in this accommodating portion 58. Note that the case 52 of the present embodiment is an example of the mounted member in the present disclosure.

The case 52 is substantially U-shaped, and has a pair of vertical wall portions 60, which are respectively disposed at the outer sides of the both side surfaces 22A of the track rail 22, and a lateral wall portion 62 that spans over the track rail 22 and connects the pair of vertical wall portions 60. Further, the shape of the case 52, including the accommodating portion 58, is a left-right symmetrical shape. Note that what is called left-right symmetrical shape here means that the shape of the case 52 has left-right symmetry with respect to a straight line that passes-through the rail width direction center of the lateral wall portion 62.

Figure 2:
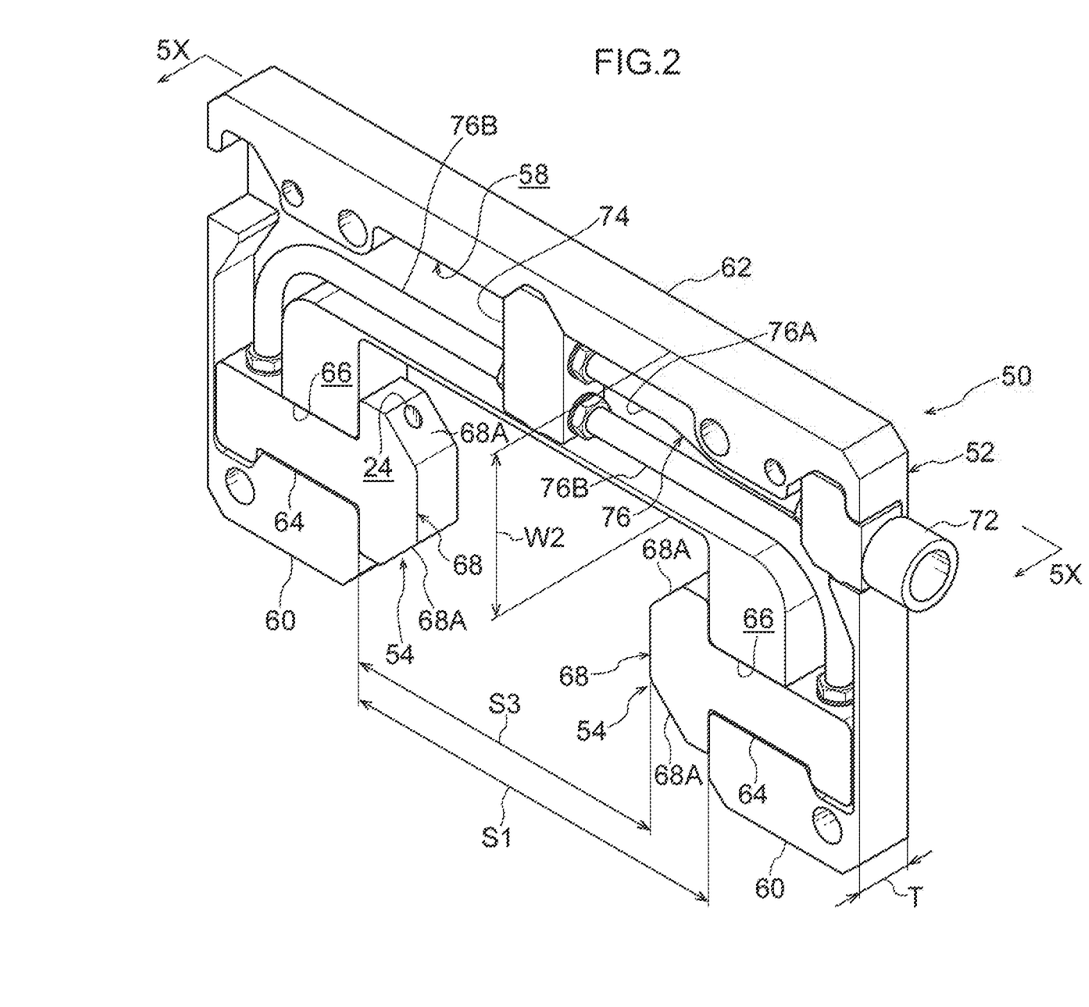
FIG. 2 is a perspective view of a lubricant supplying device relating to the first embodiment.
Figure 3:
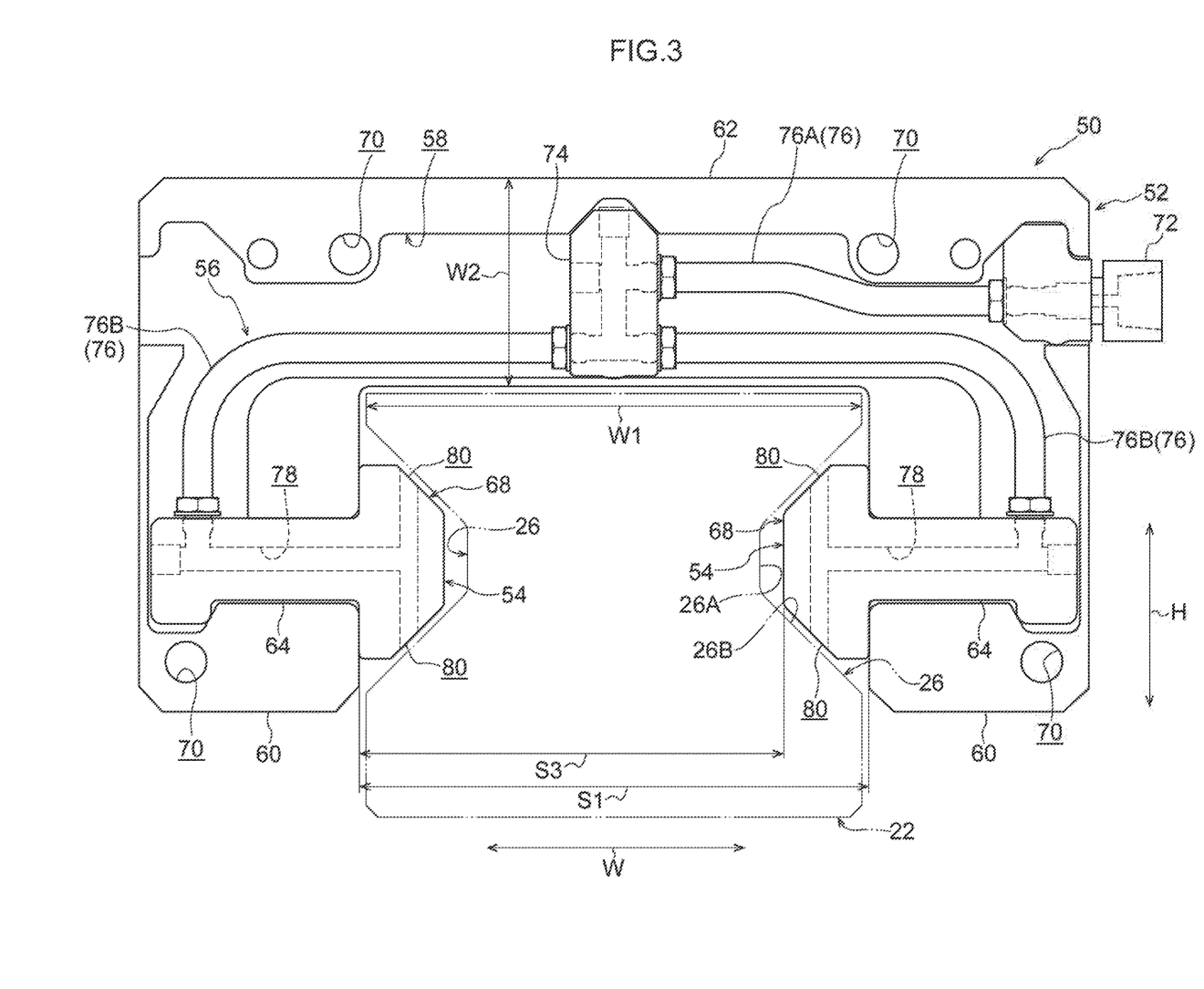
FIG. 3 is a front view of the lubricant supplying device shown in FIG. 2.

As shown in FIG. 2 and FIG. 3, interval S1 between the pair of vertical wall portions 60 is made to be greater than maximum length (hereinafter appropriately called "rail width") W1 of the track rail 22 along the rail width direction.

Therefore, in the state in which the case 52 is placed on the track rail 22, the pair of vertical wall portions 60 are disposed with gaps between themselves and the pair of concave portions 26 respectively. Namely, by making the interval S1 larger than the rail width W1, the track rail 22 is made to pass between the pair of vertical wall portions 60 from a side, and the case 52 can be disposed on the track rail 22.

Figure 7:
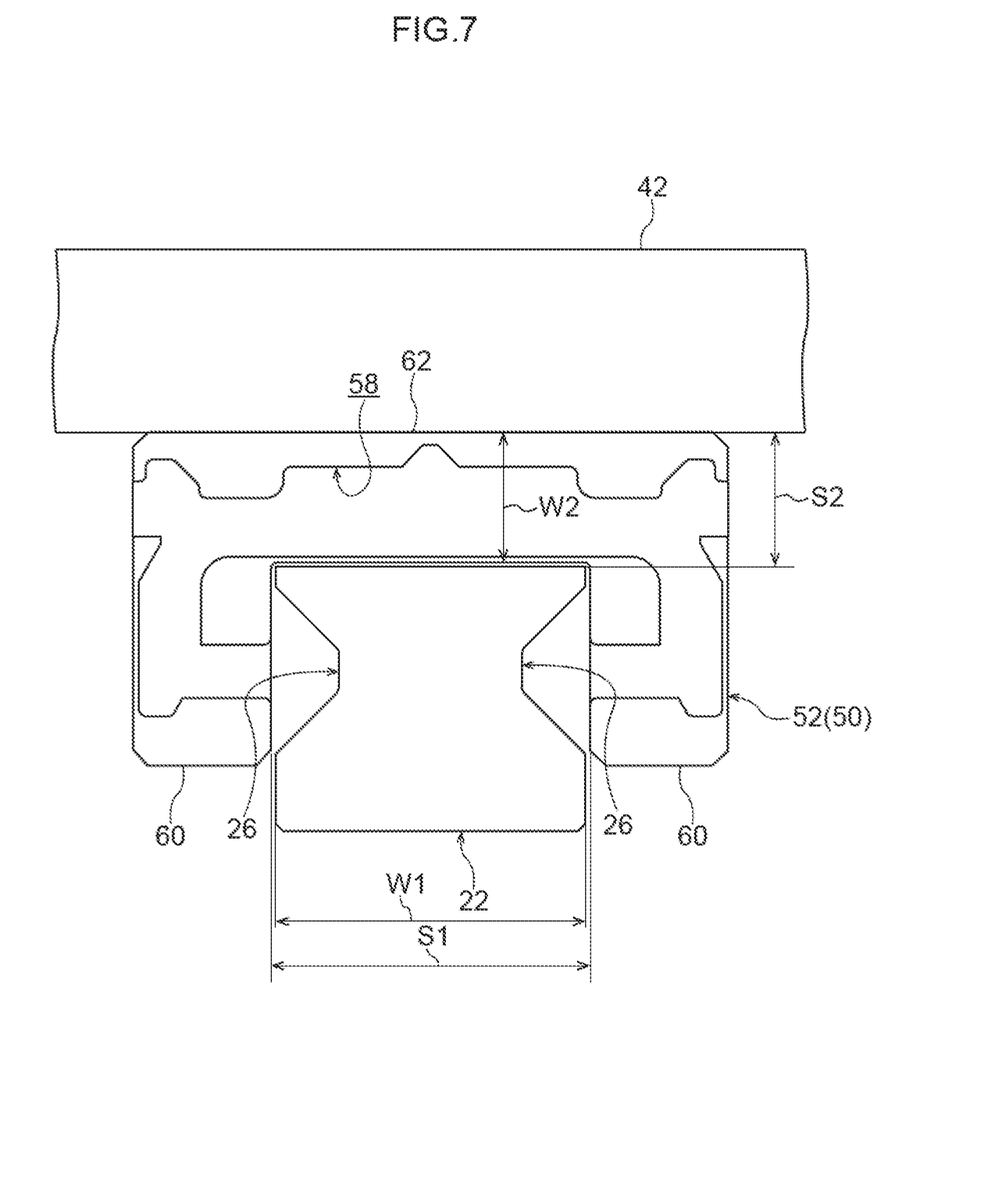
FIG. 7 is a front view in which the case of the lubricant supplying device shown in FIG. 6 is seen from the arrow 7X direction.

Further, as shown in FIG. 2 and FIG. 3, thickness T of the case 52 and width W2 (the length along the rail height direction) of the lateral wall portion 62 are made to be smaller than interval S2 (see FIG. 7) between the table 42 and the track rail 22.

Moreover, interval S3, which runs along the rail width direction from one of the vertical wall portions 60 (the vertical wall portion 60 at the left side in FIG. 3) to the supplying member 54 that is attached to the other of the vertical wall portions 60 (the vertical wall portion 60 at the right side in FIG. 3), is made to be smaller than the rail width W1. Concretely, the interval S3, which runs along the rail width direction to the apexes of the projecting portions 68, which will be described later and which project out from the one vertical wall portion 60 and the other vertical wall portion 60, is made to be smaller than the rail width W1.

Further, fit-together portions 66, into which base portions 64 of the supplying members 54 are fit, are formed in the vertical wall portions 60. In the state in which the case 52 is disposed on the track rail 22, due to the supplying members 54 being fit into the fit-together portions 66, the projecting portions 68 of the supplying members 54 are positioned within the concave portions 26. Note that the fit-together portions 66 structure portions of the accommodating portion 58.

Further, plural through-holes 70 that pass-through in the thickness direction are formed in the case 52. These through-holes 70 are provided at positions that correspond to unillustrated screw holes of the moving block 24 and to unillustrated through-holes of the cover member 34. The case 52 is mounted to the moving block 24 via the cover member 34 due to screw members 71 (see FIG. 4) being passed-through the through-holes 70 and the through-holes of the cover member 34 and being screwed into the screw holes of the moving block 24.

For example, metal materials and resin materials are examples of the material that forms the case 52.

As shown in FIG. 2, the supply path unit 56 has an introducing port 72, a distributing portion 74, a tube 76, and the supplying members 54.

The introducing port 72 is the portion into which lubricant is introduced from the exterior. For example, a supply tube that extends from an unillustrated lubricant reservoir portion is connected thereto. Lubricant is sent continuously or periodically from this lubricant reservoir portion through the supply tube to the introducing port 72.

The distributing portion 74 is provided midway along the tube 76, and is a member that distributes the lubricant.

The tube 76 is a tubular member for sending the lubricant from the introducing port 72 to the supplying members 54. This tube 76 has a first tube 76A that connects the introducing port 72 and the distributing portion 74, and second tubes 76B that connect the distributing portion 74 and the supplying members 54. Note that the tube 76 of the present embodiment is an example of the tubular member in the present disclosure.

It is preferable to use an elastic material as the material that forms the tube 76. For example, rubber, thermoplastic elastomers, and nylon are examples of this elastic material.

Figure 5:
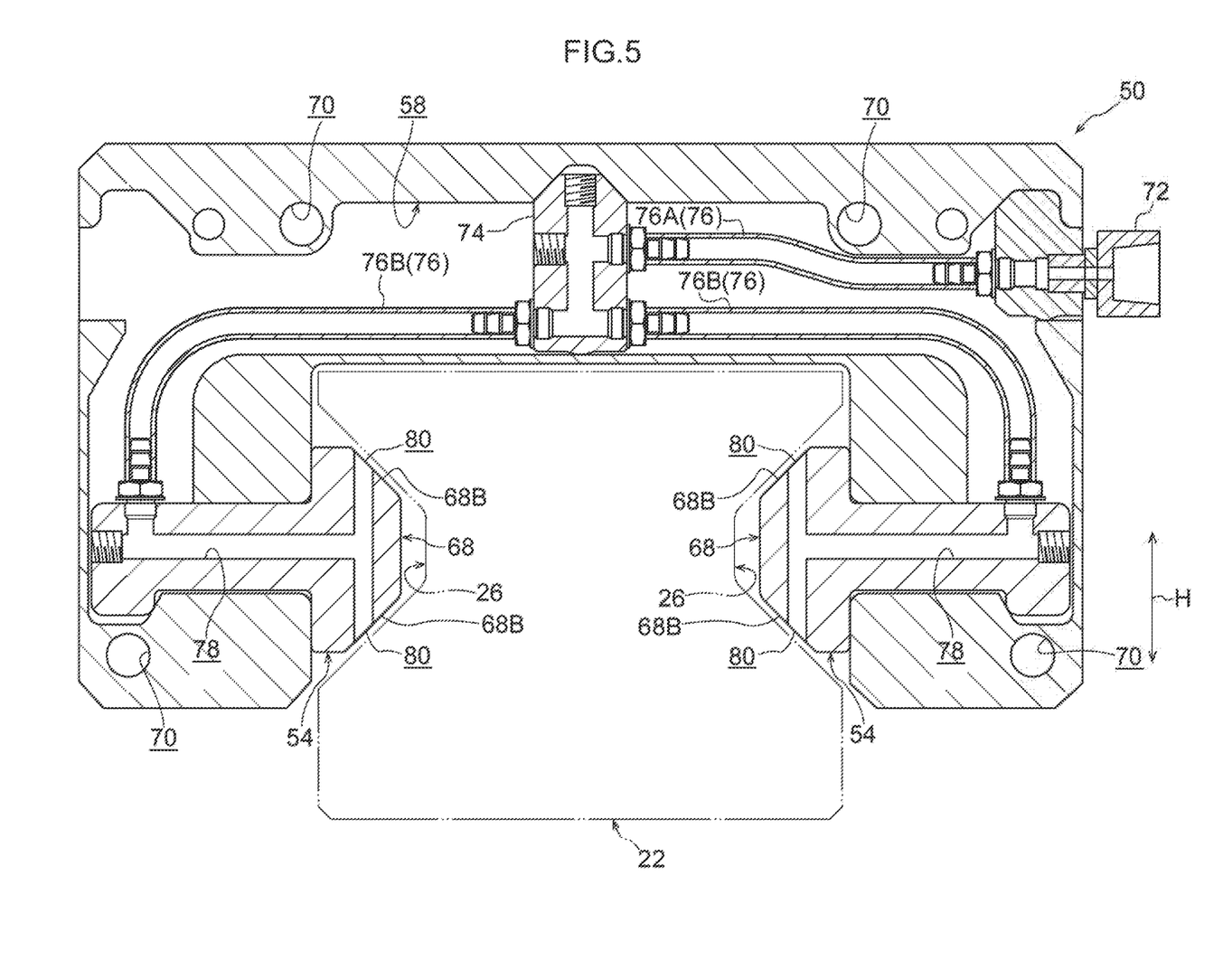
FIG. 5 is a cross-sectional view along line 5X-5X of the lubricant supplying device shown in FIG. 2.

The supplying members 54 have the base portions 64, which are fit into the fit-together portions 66 of the vertical wall portions 60, and the projecting portions 68 that project out from the vertical wall portions 60 in the state in which the base portions 64 are fit into the fit-together portions 66. The tube 76 (the second tubes 76B that are described later) are connected to these base portions 64. The lubricant is sent from the base portions 64 through internal flow paths 78 (see FIG. 5), which extend toward the projecting portions 68, to supply ports 80 that are provided at the supplying members 54.

The projecting portions 68 are formed in shapes (substantially trapezoidal shapes) that correspond to the concave portions 26 of the track rail 22. The supply ports 80 of the lubricant are respectively formed in both side wall surfaces 68A of the projecting portions 68. In the state in which the supply path unit 56 is attached to the case 52 that is placed on the track rail 22 (hereinafter appropriately called "attached state of supply path unit 56"), the projecting portions 68 project out from the vertical wall portions 60 toward the concave portions 26, and the side wall surfaces 68A face the side wall surfaces 26B, and the lubricant is supplied from the supply ports 80 to the aforementioned rolling body rolling surfaces. Concretely, in the attached state of the supply path unit 56, the side wall surfaces 68A of the projecting portions 68 are disposed so as to face the aforementioned rolling body rolling surfaces of the track rail 22 with intervals therebetween, and lubricant is supplied from the supply ports 80 to the aforementioned rolling body rolling surfaces.

For example, metal materials and resin materials are examples of the material that forms the supplying members 54 and the distributing portion 74.

Further, at the supply path unit 56, the flow path lengths from the distributing portion 74 to the pair of supplying members 54 are the same. Namely, the length of the second tube 76B, which connects the distributing portion 74 and one of the supplying members 54, and the length of the second tube 76B, which connects the distributing portion 74 and the other of the supplying members 54, are the same length.

Operation and effects of the present embodiment are described next.

At the lubricant supplying device 50, the shape of the case 52 is a shape that is substantially U-shaped and at which the pair of vertical wall portions 60 are disposed with intervals between themselves and the concave portions 26, i.e., is a shape in which the interval S1 between the pair of vertical wall portions 60 is larger than the rail width W1 of the track rail 22. Therefore, even if the case 52 is not placed on the track rail 22 by being inserted in from an end portion of the track rail 22, the case 52 can be placed on the rail by passing the track rail 22 between the pair of vertical wall portions 60 from a side of the track rail 22. Then, the supply path unit 56 is accommodated, from the rail length direction, into the accommodating portion 58 of the case 52 that is on the track rail 22, and the supply path unit 56 is attached to the case 52. Thereafter, due to the case 52 being mounted to the moving block 24 with the accommodating portion 58 side facing the moving block 24, the lubricant supplying device 50 can be added afterwards to the moving block 24. Due thereto, the lubricant supplying device 50 can be added afterwards even to the moving block 24 that is positioned in the middle among the plural moving blocks 24 that are disposed on the track rail 22. Therefore, there is no need to, after temporarily removing the moving block 24 from the end portion of the track rail 22, mount the lubricant supplying device 50 to the moving block 24 that is positioned in the middle, and thus, the mounting workability of the lubricant supplying device 50 improves.

Figure 6:
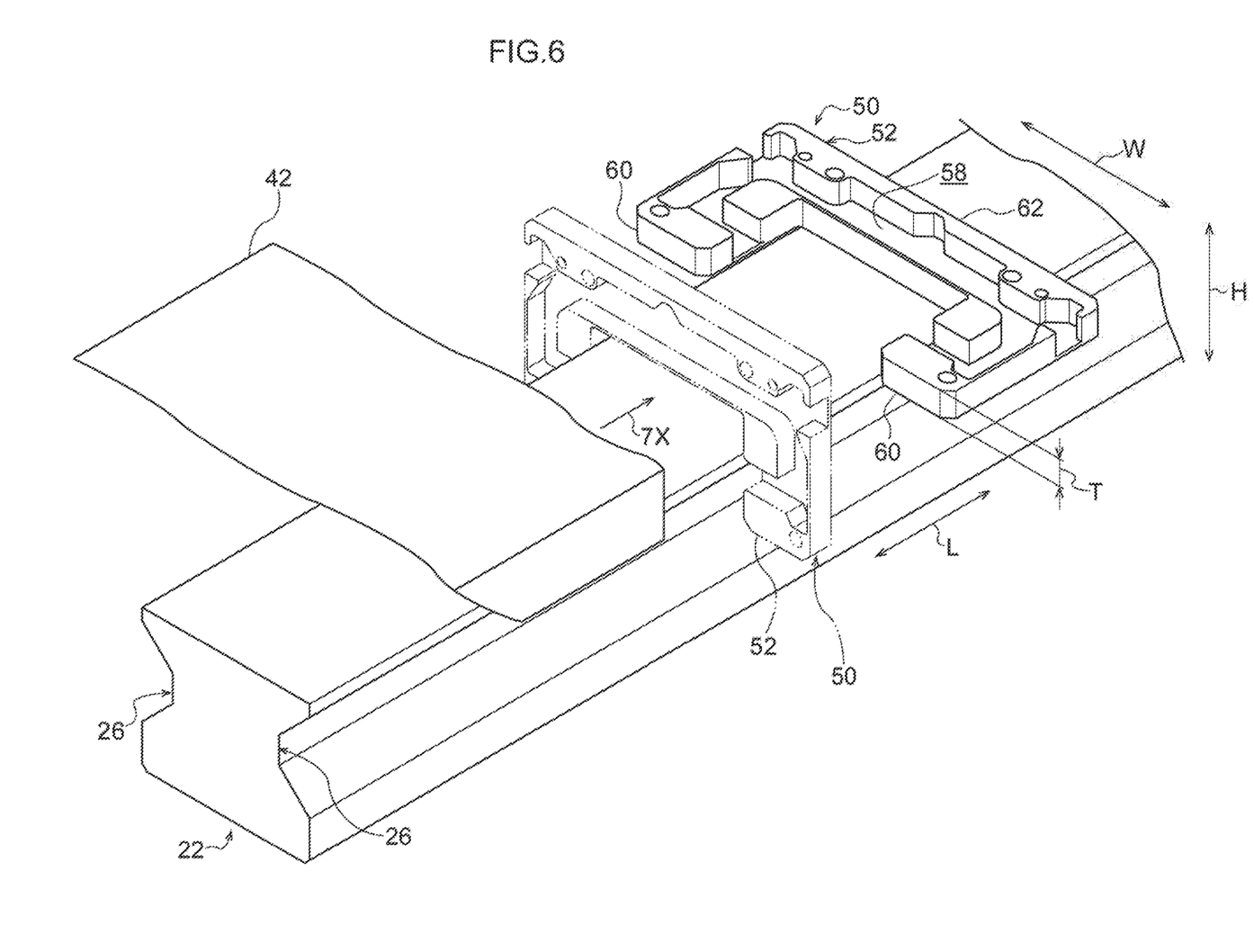
FIG. 6 is a perspective view showing a state in which a case of the lubricant supplying device shown in FIG. 2 is tipped over onto a track rail.

Further, with respect to the moving blocks 24 that support the table 42 among the plural moving blocks 24, the thickness T of the case 52 is made to be smaller than the interval between the table 42 and the track rail 22 in the lubricant supplying device 50. Therefore, as shown in FIG. 6, the case 52 can be tipped over and inserted into the gap between the moving block 24 and the track rail 22. Further, because the width W2 of the lateral wall portion 62 is made to be smaller than the interval S2 between the table 42 and the track rail 22, the case 52 can be disposed on the rail (refer to FIG. 6 and FIG. 7) by setting upright the case 52 that has been tipped over and inserted into the gap between the moving block 24 and the track rail 22. Namely, at the lubricant supplying device 50, the case 52 can be placed on the track rail 22 from a side of the track rail 22, even for the moving blocks 24 that support the table 42.

In the lubricant supplying device 50, the supply path unit 56 that has the supplying members 54 can be attached to the case 52 by the simple operation of accommodating the supply path unit 56 in the accommodating portion 58. Concretely, by accommodating the introducing port 72, the tube 76 and the distributing portion 74 into the accommodating portion 58 of the case 52, and fitting the supplying members 54 into the fit-together portions 66 of the vertical wall portions 60, the side wall surfaces 68A of the projecting portions 68 can be disposed so as to face the aforementioned rolling body rolling surfaces of the track rail 22 within predetermined intervals therebetween.

Further, in the lubricant supplying device 50, the flow path lengths from the distributing portion 74 to the pair of supplying members 54 are made to be the same length. Therefore, the supplied amount of the lubricant, which is supplied from the supply ports 80 of the supplying members 54 to the aforementioned rolling body rolling surfaces of the track rail 22, can be made to be close to uniform.

Moreover, in the lubricant supplying device 50, for the track rail 22 that has a shape in which the concave portions 26 are provided at the both side surfaces 22A respectively, the case 52 can be placed on the track rail 22 from a side of the track rail 22.

Further, at the guiding device 20, lubricant is supplied to the aforementioned rolling body rolling surfaces of the track rail 22 from the lubricant supplying device 50 that is mounted to the moving block 24. Therefore, frictional resistance between the rollers 28 and the aforementioned rolling body rolling surfaces can be reduced. Due thereto, the moving block 24 can move smoothly on the track rail 22 over a long period of time.

Further, an unillustrated sealing member that contacts the track rail 22 may be provided at the outer side in the moving direction of the lubricant supplying device 50 that is mounted to the moving block 24. Entry of dust and the like into the moving block 24 from the exterior can be suppressed by making a sealing member contact the track rail 22. Note that a scraper that is made of metal, or the like, may be provided together with the sealing member.

Second Embodiment

Figure 9:
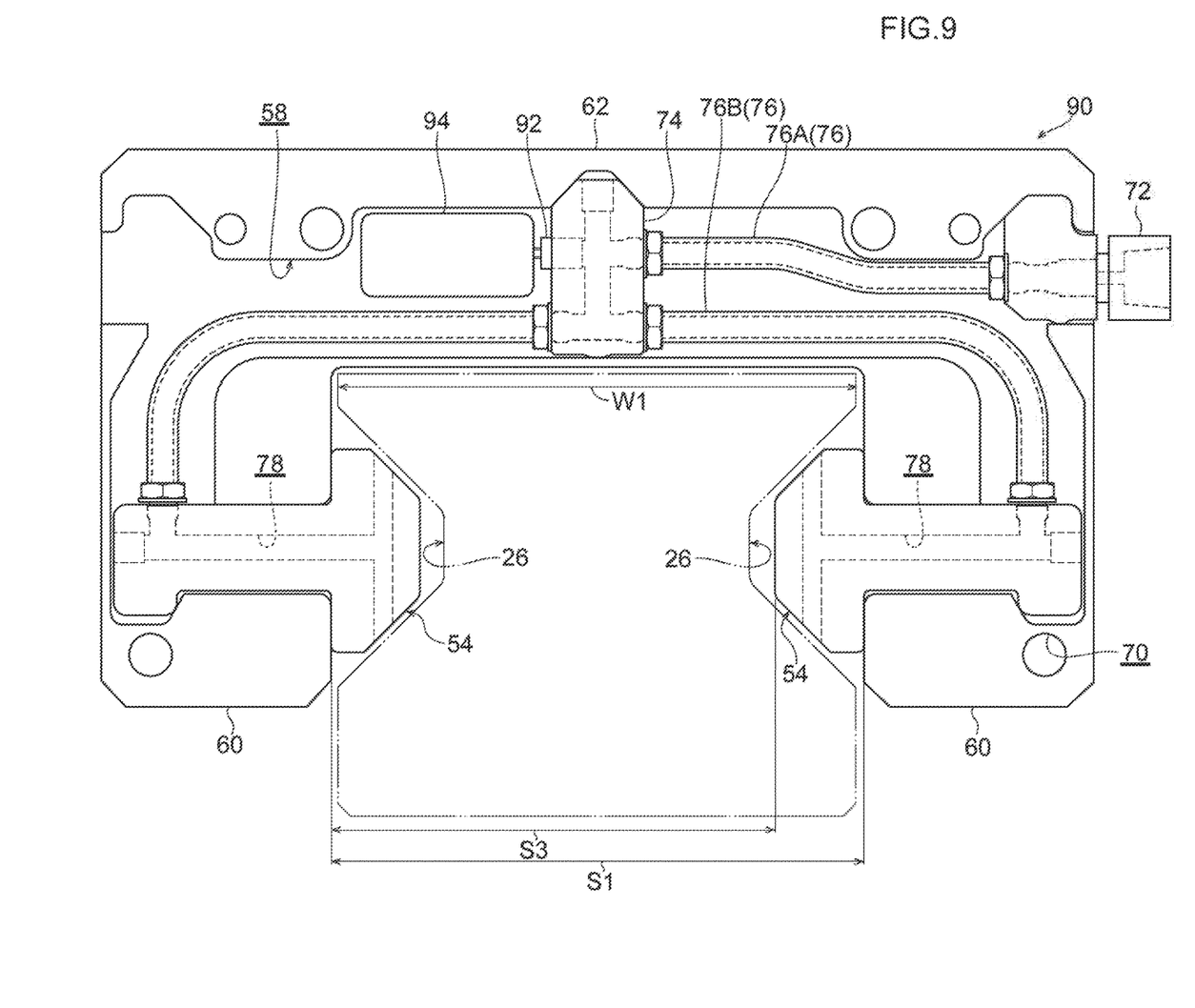
FIG. 9 is a front view of a lubricant supplying device relating to a second embodiment.

A lubricant supplying device 90 of a second embodiment is shown in FIG. 9. In the lubricant supplying device 90 of the present embodiment, the structure of having a pressure sensor 92 and a sensor unit 94 differs from the lubricant supplying device 50 of the first embodiment. On the other hand, other than the structures of the pressure sensor 92 and the sensor unit 94, the lubricant supplying device 90 is the same as the lubricant supplying device 50, and therefore, description of structures that are the same as those of the lubricant supplying device 50 is omitted. Further, structures that are the same as those of the first embodiment are denoted by the same reference numerals.

As shown in FIG. 9, in the lubricant supplying device 90, the pressure sensor 92 is mounted to the distributing portion 74. This pressure sensor 92 detects the pressure within the distributing portion 74, and sends it to the sensor unit 94. The sensor unit 94 is electrically connected to the pressure sensor 92. Further, the sensor unit 94 is accommodated in the accommodating portion 58 of the case 52. This sensor unit 94 is structured so as to wirelessly transmit the detected value that is detected by the pressure sensor 92.

Operation and effects of the lubricant supplying device 90 of the present embodiment are described next. Note that description of operation and effects that are the similar to the operation and effects obtained in the first embodiment is omitted appropriately.

In the lubricant supplying device 90 of the present embodiment, the pressure within the distributing portion 74 is detected by the pressure sensor 92, and the detected value is transmitted wirelessly from the sensor unit 94. The amount of lubricant supplied from the supply ports 80 of the supplying members 54 can be obtained by receiving the detected value that has been transmitted.

Note that there may be a structure in which, for example, the detected value that is transmitted is received at the control section of an unillustrated lubricant reservoir portion, and the amount of lubricant that is supplied via the supply tube is adjusted in accordance with the amount of lubricant supplied from the supply ports 80.

The guiding device 20 of the first embodiment is structured such that the lubricant supplying devices 50 are respectively mounted to both sides in the moving direction of the moving block 24. However, the present disclosure is not limited to this structure, and may be structured such that the lubricant supplying device 50 is mounted to only one side in the moving direction of the moving block 24. Note that the structure in which the lubricant supplying device is mounted to only one side of the moving block 24 may be applied to the second embodiment. Further, there may be a structure in which the lubricant supplying device 50 is mounted to one side in the moving direction of the moving block 24, and the lubricant supplying device 90 is mounted to the other side.

The guiding device 20 of the first embodiment is structured such that the table 42 is supported by the plural moving blocks 24, but the present disclosure is not limited to this structure. For example, there may be a structure in which the base portion of a device or equipment or the like is supported by the plural moving blocks 24. Note that the structure in which the base portion of a device or equipment or the like is supported by the plural moving blocks 24 may be applied to the second embodiment.

The guiding device 20 of the first embodiment is structured such that the rollers 28 are used as an example of the rolling bodies of the moving block 24, but the present disclosure is not limited to this structure. For example, there may be a structure in which balls are used as an example of the rolling bodies of the moving block 24. Note that the structure in which balls are used as an example of the rolling bodies of the moving block 24 may be applied to the second embodiment.

Moreover, although the guiding device 20 of the first embodiment is structured such that the track rail 22 extends rectilinearly, the present disclosure is not limited to this structure. For example, there may be a structure in which the track rail 22 extends in a curved shape, or there may be a structure in which the track rail has a rectilinear portion that extends rectilinearly and a curved portion that extends in a curved shape. Note that the structure in which the track rail extends in a curved shape, and the structure in which the track rail 22 has a rectilinear portion and a curved portion, may be applied to the second embodiment.

Still further, in the lubricant supplying device 50 of the first embodiment, the interval S3, which runs along the rail width direction from one of the vertical wall portions 60 to the supplying member 54 that is attached to the other vertical wall portion 60, is made to be smaller than the rail width W1. However, the present disclosure is not limited to this structure. For example, the interval S3 may made to be greater than or equal to the rail width W1. In this case, the case 52 can be placed on the track rail 22 even in a state in which the supply path unit 56 is attached in advance to the case 52 and the supplying member 54 is removed from one of the vertical wall portions 60. Then, the lubricant supplying device 50 can be added afterward to the moving block 24 by attaching the supplying member 54 to the aforementioned one of the vertical wall portions 60 and by mounting the case 52 to the moving block 24. Note that the structure of making the interval S3 greater than or equal to the rail width W1 may be applied to the second embodiment.

Figure 10:
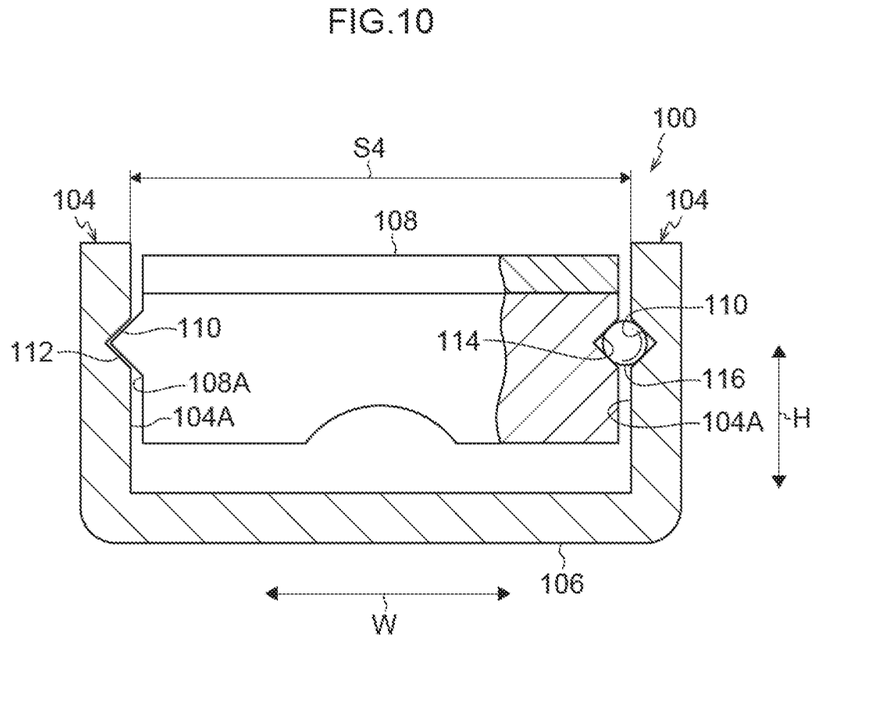
FIG. 10 is a cross-sectional view of a track rail of a guiding device relating to another embodiment.
Figure 11:
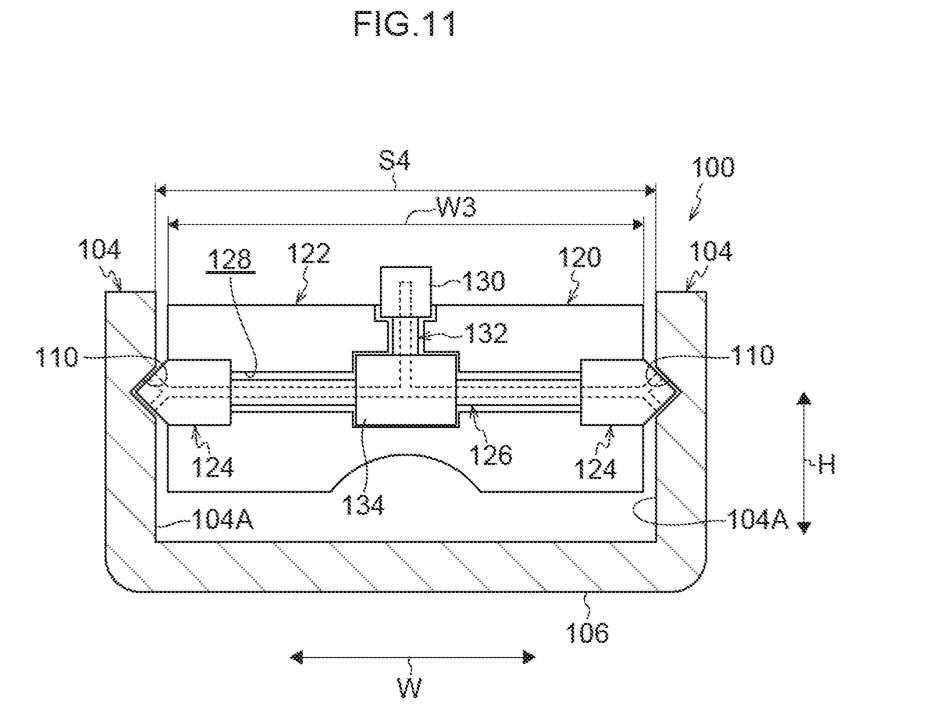
FIG. 11 is a front view of a lubricant supplying device that is used in the guiding device shown in FIG. 10.

In the guiding device 20 of the first embodiment, the cross-sectional shape of the track rail 22 is made to be substantially quadrangular, and the case 52 that is an example of the mounted member is made to be a shape that spans over the track rail 22. However, the present disclosure is not limited to this structure. For example, as in a guiding device 100 that is shown in FIG. 10 and FIG. 11, there may be a structure in which a track rail 102 has a pair of vertical wall portions 104 that are disposed with an interval therebetween in the rail width direction, and a lateral wall portion 106 that connects the end portions of the pair of vertical wall portions 104, and in which a moving block 108 moves along the track rail 102 between the pair of vertical wall portions 104. Concave portions 110, which are continuous along the rail length direction of the track rail 102, are provided at inner surfaces 104A (the surfaces at the rail width direction inner sides) of the vertical wall portions 104. The cross-sectional shapes of these concave portions 110 are substantially V-shaped, and projecting portions 112, which project out from side surfaces 108A of the moving block 108, are fit-together with the concave portions 110. Further, concave portions 114 whose cross-sectional shapes are substantially V-shaped are provided in the side surfaces 108A of the moving block 108, between the projecting portions 112 of the both end portions in the moving direction. This moving block 108 moves on the track rail 102 in cooperation with plural balls 116 of the moving block 108 rolling between the concave portions 110 and the concave portions 114. Note that the plural balls 116 circulate within an unillustrated ball case that is provided within the moving block 108. Further, a lubricant supplying device 120 has a case 122, which is substantially rectangular and whose maximum width (maximum width along the rail width direction) W3 is narrower than interval S4 between the pair of vertical wall portions 104 of the track rail 102, and a supply path unit 126 that includes supplying members 124 that are attached to the case 122. Note that the case 122 of the present embodiment is an example of the mounted member in the present disclosure. An accommodating portion 128, which is concave and is for accommodating the supply path unit 126, is provided in the case 122. The supply path unit 126 has an introducing port 130, a tube 132 that connects the supplying members 124 and the introducing port 130, a distributing portion 134 that is provided midway along the tube 132, and the supplying members 124 that supply lubricant, which is fed from the tube 132, to rolling body rolling surfaces that are structured by at least portions of side wall surfaces 110A of the concave portions 110 of the track rail 102. The supplying members 124 are inserted into the concave portions 110 of the track rail 102 due to the supply path unit 126 being attached from the rail length direction to the case 122 that is disposed within the track rail 102. Namely, at the lubricant supplying device 120, the case 122 can be disposed at the track rail 102, not from an end portion of the track rail 102, but from a side of the track rail 102 (in detail, from between the pair of vertical wall portions 104). Due thereto, even if a plurality of the moving blocks 108 are disposed within the track rail 102, the case 122 can be placed at the track rail 102 from midway along the track rail 102.

Although forms for embodying the present disclosure have been described by using the embodiments as examples, these embodiments are examples, and the present disclosure can be embodied by being modified in various ways within a scope that does not depart from the gist thereof. Further, it goes without saying that the scope of the right of the present disclosure is not limited to these embodiments.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A lubricant supplying device for a moving member with rolling bodies that roll along rolling surfaces of concave portions provided along a length direction of a rail, the lubricant supplying device comprising:

a mounted member mountable to the moving member with an interval between the mounted member and the concave portions; and a supply path unit removably attached to the mounted member, wherein the supply path unit has an introducing port into which a lubricant is externally supplied, supplying members that project out from the mounted member toward the concave portions for supplying the lubricant to the rolling surfaces of the concave portions, and a tubular member that connects the introducing port and the supplying members, the mounted member has an accommodating portion that is concave and that accommodates the supply path unit, the mounted member has a pair of vertical wall portions and a lateral wall portion connecting the pair of vertical wall portions, the lateral wall portion spanning over the rail and each of the pair of vertical wall portions being respectively disposed across from each of the concave portions at each outer side surface of the rail when the mounted member is mounted to the moving member, the supplying members are attached respectively to each of the pair of vertical wall portions, an interval between the pair of vertical wall portions is made to be greater than a rail width of the rail along a rail width direction, fit-together portions are formed in the vertical wall portions, and the supplying members have base portions and projecting portions, the base portions being fit into the fit-together portions of the vertical wall portions, and the projecting portions projecting out from the vertical wall portions in a state in which the base portions are fit into the fit-together portions.

2. The lubricant supplying device of claim 1, wherein the supply path unit is attached to the mounted member such that a pair of supplying members respectively project out toward the concave portions, the supply path unit has a distributing portion that distributes the lubricant midway along the tubular member, and flow path lengths from the distributing portion to the pair of supplying members are the same.

3. The lubricant supplying device of claim 2, wherein the moving member has a supporting surface that supports a supported member, and a thickness of the mounted member and a width of the lateral wall portion are smaller than an interval between the supporting surface on the moving member and the rail.

4. A guiding device comprising:

a rail in which concave portions extend along a length direction;

a moving member that moves along the rail, and that includes rolling bodies that roll on rolling surfaces of the concave portions; and a lubricant supplying device mounted to the moving member and supplying lubricant to the rolling surfaces, wherein the lubricant supplying device has a mounted member mounted to the moving member with an interval between the mounted member and the concave portions, and a supply path unit removably attached to the mounted member, the supply path unit has an introducing port into which the lubricant is externally supplied, supplying members that project out from the mounted member toward the concave portions for supplying the lubricant to the rolling surfaces of the concave portions, and a tubular member that connects the introducing port and the supplying members, the mounted member has an accommodating portion that is concave and that accommodates the supply path unit, the mounted member has a pair of vertical wall portions and a lateral wall portion connecting the pair of vertical wall portions, the lateral wall portion spanning over the rail, each of the pair of vertical wall portions being respectively disposed across from each of the concave portions at each outer side surface of the rail, the supplying members are attached respectively to each of the pair of vertical wall portions, an interval between the pair of vertical wall portions is made to be greater than a rail width of the rail along a rail width direction, fit-together portions are formed in the vertical wall portions, and the supplying members have base portions and projecting portions, the base portions being fit into the fit-together portions of the vertical wall portions, and the projecting portions projecting out from the vertical wall portions in a state in which the base portions are fit into the fit-together portions.

5. A lubricant supplying device for a moving member with rolling bodies that roll along rolling surfaces of concave portions provided along a length direction of a rail, the lubricant supplying device comprising:

a mounted member mountable to the moving member with an interval between the mounted member and the concave portions; and a supply path unit removably attached to the mounted member, wherein the supply path unit has an introducing port into which a lubricant is externally supplied, supplying members that project out from the mounted member toward the concave portions for supplying the lubricant to the rolling surfaces of the concave portions, and a tubular member that connects the introducing port and the supplying members, the mounted member has an accommodating portion that is concave and that accommodates the supply path unit, the mounted member has a pair of vertical wall portions and a lateral wall portion connecting the pair of vertical wall portions, the lateral wall portion spanning over the rail and each of the pair of vertical wall portions being respectively disposed across from each of the concave portions at each outer side surface of the rail when the mounted member is mounted to the moving member, the supplying members are attached respectively to each of the pair of vertical wall portions, and a thickness of the mounted member and a width of the lateral wall portion are smaller than an interval between a supporting surface on the moving member for supporting a supporting member and the rail when the mounted member is mounted to the moving member.

* * * * *